United States Patent [19]

Druke et al.

[11] 4,399,505
[45] Aug. 16, 1983

[54] EXTERNAL MICROCODE OPERATION IN A MULTI-LEVEL MICROPROCESSOR

[75] Inventors: Michael B. Druke, Chelmsford, Mass.; Richard L. Feaver, Sunnyvale, Calif.; Stefan Kosior, Chepachet, R.I.

[73] Assignee: Data General Corporaton, Westboro, Mass.

[21] Appl. No.: 232,238

[22] Filed: Feb. 6, 1981

[51] Int. Cl.³ .............................................. G06F 9/22
[52] U.S. Cl. .................................................... 364/200
[58] Field of Search ... 364/200 MS File, 900 MS File

[56] References Cited

U.S. PATENT DOCUMENTS 3,478,322  11/1969  Evans ................................. 364/200

Primary Examiner—Raulfe B. Zache
Attorney, Agent, or Firm—Robert F. O'Connell

[57] ABSTRACT

A data processing system the central processing unit (CPU) of which is responsive to and executes microinstructions generated by the decoding of macroinstructions so as to provide one or more data processing operations. The system is arranged so that such microinstructions can be supplied to the CPU from a CPU-resident microcode decoding logic or from one or more external microcode decoding units. Each of the external units can identify a macroinstruction which it is capable of decoding and includes logic for externally providing one or more microinstructions which result from the decoding process. If an external microcode unit and the CPU-resident decode logic are both capable of such decoding operation, the external unit overrides the CPU decoding logic and controls the decoding operation externally. The external microcode unit includes logic for monitoring the number of microinstructions supplied to the CPU which have not yet been executed by the CPU.

11 Claims, 4 Drawing Figures

EXTERNAL MICROCODE OPERATION IN A MULTI-LEVEL MICROPROCESSOR

INTRODUCTION

This invention relates to data processing systems using microprocessors and, more particularly, to systems which use microcode architecture and are capable of responding to externally supplied microcoded instructions by utilizing unique interface techniques therefor.

BACKGROUND OF THE INVENTION

Data processing systems have generally been developed to provide system configurations which range from compact singleboard micro-computers to more complex high performance minicomputers. Such systems use microcode architecture in which macroinstructions are suitably decoded so as to provide access to a micro-instruction or to a sequence of more than one micro-instruction obtained from a suitable data store thereof.

In order to reduce the data storage space required for the microinstructions and to avoid handling a large number of "wide" instruction words, certain microcode systems have utilized multi-level, in most cases "two-level", microcode store techniques, as opposed to one-level microcode stores, as is known in the art. One such two-level microcode system which is used to increase the power of a conventional two-level microcode technique has been described in currently pending U.S. patent application Ser. No. 120,272, filed Feb. 11, 1980 and entitled "Data Processing System" as filed by Bernstein et al. and assigned to Data General Corporation of Westboro, Mass., such application being incorporated by reference herein.

In accordance with the system described therein, the microcontrol store is formed as an "orthogonal" store in which a first, or "vertical", microcontrol store provides a "narrow" microinstruction word portion having one field comprising a selected number of vertical microinstruction bits for selecting one of a plurality of second, or "horizontal", microinstructions from a second level, or horizontal, microcontrol store, one or more "modifier" fields, as described in such application, and a sequencing field for presenting the address of the next (i.e., each successive) vertical microinstruction in a sequence thereof. As described therein, vertical microinstructions (microcodes) can be fetched either from a CPU-resident vertical control ROM or from one or more external microcontrollers via one or more external microcontroller interface units. The external microcodes can be obtained at any one time from one of the plurality of external microcontroller units by the use of suitable time-multiplexing techniques using a time-multiplexed microcode bus.

While such system has provision for supplying external microcode information utilizing appropriate software, for example, the most effective way for providing such external microcode information is described with reference to the invention disclosed herein. Accordingly, in order to achieve effective use of both the CPU-resident microcode information and the external microcode information, the invention provides for suitable interface logic which permits the most effective control of the transfer of external microcode information from an external microcode unit. While the invention is applicable to such multi-level microcode systems, its use is not limited thereto and the principles thereof are also applicable to single-level systems.

SUMMARY OF THE INVENTION

In accordance with the invention, a unique microcode control interface unit is utilized wherein every macroinstruction supplied, for example, by software to the system is simultaneously decoded by both the CPU-resident microcode control unit and the microcode interface units. A subset of the operational code (OP-CODE) in the macroinstruction identifies which type of microcode control unit (i.e., an external microcode unit or an internal, i.e., a CPU-resident, unit) is required to perform the decoding operation in order to produce the required microinstruction or sequence of microinstructions. If the OP-CODE identifies a situation in which both an external and an internal microcode control unit are capable of performing the decoding operation, appropriate logic is provided by the selected external unit so that the external microcode controller can override the CPU-resident controller and, therefore, can provide the required decoding operation.

The external microcontrol interface unit includes logical capability for determining the successive addresses of successive microinstructions in a sequence thereof within the external interface unit itself without the need for any logical operations to be performed by any CPU-resident control logic units.

The external microcontrol interface unit also has unique logic for monitoring the transfer of microinstructions from the external unit to the CPU and for monitoring the execution thereof by the CPU so that, at any point in time, the external microcontroller unit keeps track of the difference between how many microinstructions have been transferred and how many of such microinstructions have been executed by the CPU, and, accordingly, how many of the transferred microinstructions have yet to be executed.

DESCRIPTION OF THE INVENTION

The invention can be described more fully with the help of the accompanying drawings wherein.

Figure 1:
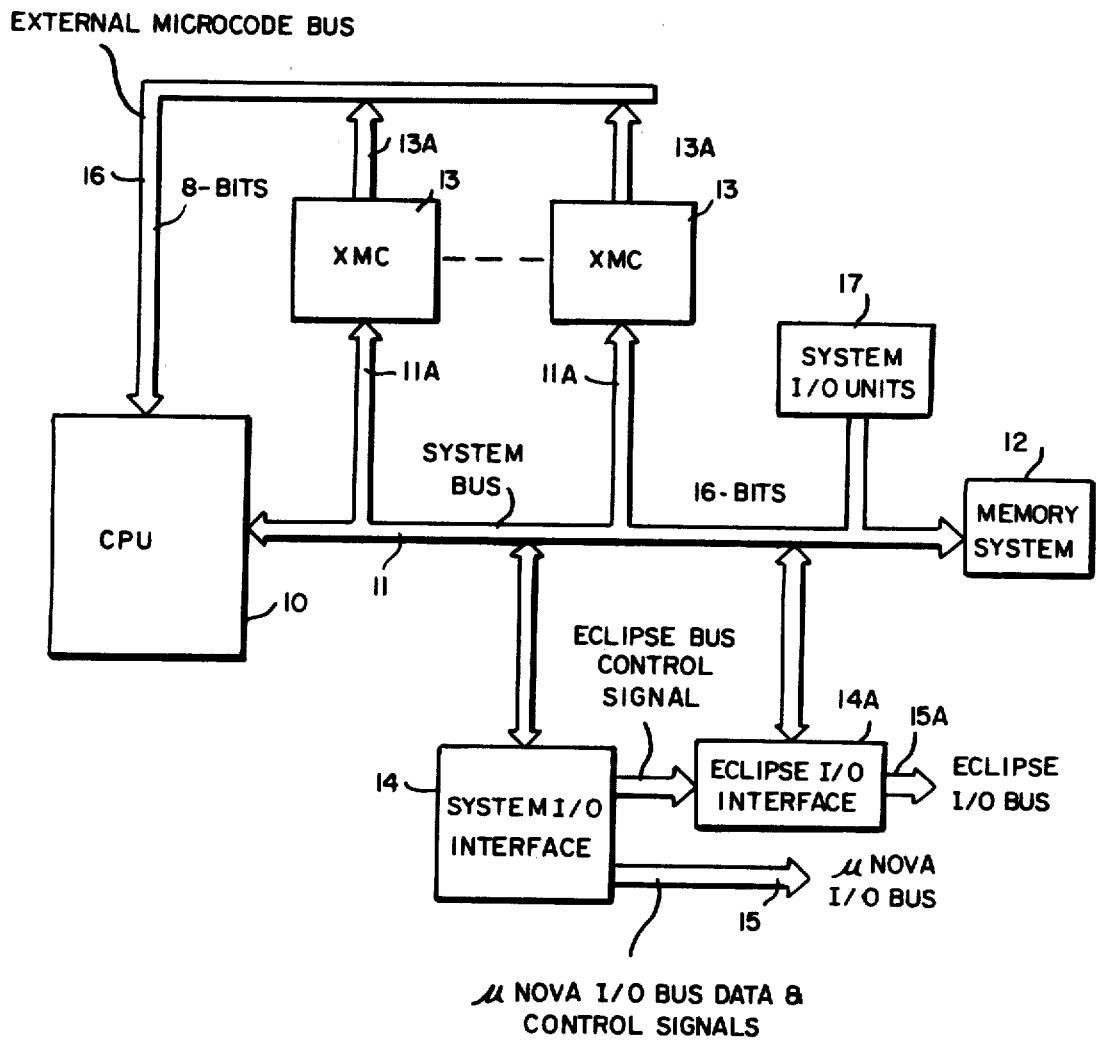
FIG. 1 shows a broad block diagram of an overall system which utilizes the invention.

An overall system which utilizes the external microcontroller interface unit of the invention is shown in FIG. 1 wherein a microprocessor unit, identified as a central processor unit or CPU 10 in the figure, is interconnected via an appropriate system bus 11 with a memory system 12, one or more system input/output (I/O) units 17, I/O interface units 14 and 14A for interfacing I/O units via different I/O bus means 15 and 15A, respectively, and one or more external microcontroller (XMC) interface units 13. In a particular embodiment of the system, for example, the system bus 11 may be in the form of a 16-bit parallel system bus while 16-bit microcode inputs from an external microcontroller unit 13 can be transmitted to the CPU in a time-multiplexed fashion via an intermediate 8-bit bus 13A and the 8-bit microcode bus 16. Further 16-bit intermediate system buses 11A are provided from the main system bus 11 to the external microcontroller units 13 as shown.

The system of FIG. 1 is generally described in the aforementioned U.S. patent application of Bernstein et al. and the particular operation of the CPU and its operational relationship with the memory and various I/O units and buses is described therein in detail. Further explanation of such detailed operation is not necessary in order to describe this invention and, accordingly, reference is made to the previously filed application for an understanding of the overall system operation and such application as mentioned above is hereby incorporated by reference for such purpose. For convenience the invention is described as used in such multi-level microcode system although, as mentioned above, its use is not limited thereto.

In systems which utilize multi-level (e.g., two-level) microcode architecture (as in the above referred to application) and which provide for the supplying of external microcode information, as in the system of FIG. 1, the latter information must be supplied through one or more suitable interface units such as shown by units 13 of the figure. In conventional systems capable of utilizing external microcode operation, the CPU normally requires appropriate logic which responds to software for identifying the macroinstruction to be decoded as one which requires decoding either by the internal microcode architecture or by the external microcode architecture. Once the CPU has identified the macroinstruction as requiring an external microcode decoding procedure, it supplies the macroinstruction to the designated external microcontroller unit which then proceeds to decode the macroinstruction so as to provide the initial microinstruction via the microcode bus.

In many such conventional systems once the initial microinstruction has been provided to the CPU from an external microcode unit, the CPU then utilizes its own internal sequencing logic and microcode control store to provide the subsequent microinstructions of the particular sequence required by the decoded macroinstruction. Control of the macroinstruction decoding process, as well as the process for determining the address of each subsequent microinstruction required in the sequence, effectively, therefore, resides in the CPU.

In contrast, the external microcontrol interface unit of the invention permits control of the macroinstruction decoding and the sequencing of the microinstructions to reside fully in the external microcontroller unit itself so as to provide a more effective and efficient use of an instruction register "pipe-lining" process which is conventionally utilized in the CPU of such a two-level microcode system of the type described above.

Figure 2:
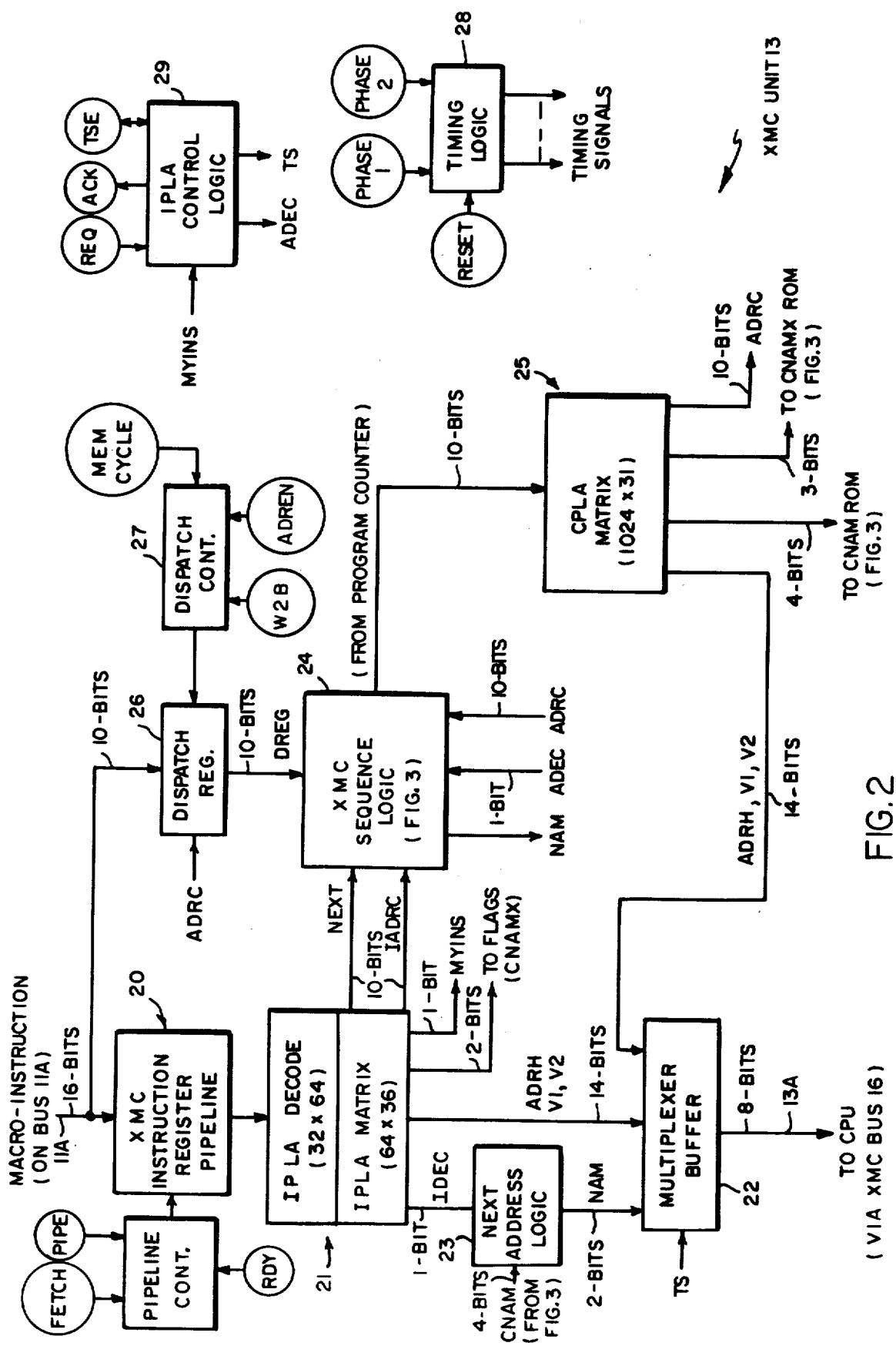
FIG. 2 shows a more specific block diagram of an exemplary external microcontroller interface unit as used in the system of FIG. 1.

FIG. 2 shows an exemplary external microcontroller interface (XMC) unit 13 having a configuration which would be utilized in each of the XMC units 13 shown in FIG. 1. In such exemplary unit a macroinstruction is supplied under control of CPU via an intermediate system bus 11A, such macroinstruction being defined by a suitable 16-bit word, as shown.

The macroinstruction is supplied to the XMC instruction register 20 which supplies such macroinstruction, in a pipe-lined manner, to a decode/matrix unit 21 which utilizes a suitable instruction program logic array (IPLA) matrix providing for appropriate decoding of the macroinstruction to produce an initial microinstruction. Such decoding, for example, is of the same nature as is discussed with reference to the CPU-resident decode control PLA unit which is disclosed in the aforesaid application. The initial microinstruction includes the horizontal address bits field (ADRH) and the two vertical modifier fields ($V_1$, $V_2$), the six-bit horizontal address and each of the four-bit vertical modifiers being supplied to the CPU via the XMC bus 16 and intermediate bus 13A through an appropriate multiplexer and buffer unit 22. The multiplexer unit supplies such fields as part of two time-multiplexed eight-bit bytes as depicted at the output thereof. The IPLA decode unit 21 also supplies a two-bit "initial next address mode" (INAM) signal via a next address ROM unit 23 to the multiplexer buffer unit 22 so that a total of 16-bits (ADRH, V1, V2 and INAM) are supplied via multiplexer and buffer unit 22 to bus 13A for the initial microinstruction.

The IPLA decode/matrix unit 21 also supplies a next address mode (NEXT) field of 10 bits and an initial address control (IADRC) field of 10 bits to the XMC sequence logic unit 24, the structure and operation of which is explained in more detail with reference to FIG. 3.

The sequence unit 24 then controls the supplying of a sequence of horizontal address and vertical modifier fields via a control program logic array decode (CPLA) matrix unit 25, as discussed below, each of the sequence of horizontal addresses and vertical modifiers then being appropriately supplied in sequence via multiplexer/buffer unit 22 to the CPU, following the prior supplying thereto of the initial address and modifiers directly from the IPLA decode/matrix unit 21. During a sequence the next address can be supplied to sequence logic 24 from a source external to the microcontroller unit 13 via a dispatch register 26, such addresses being dispatched to the external microcontroller unit 13 via system bus 11 and interconnecting XMC bus 11A under the control of appropriate dispatch control logic 27. Suitable timing logic unit 28 is utilized to provide suitable timing control signals to the various components of the external microcontrol unit 13.

Figure 3:
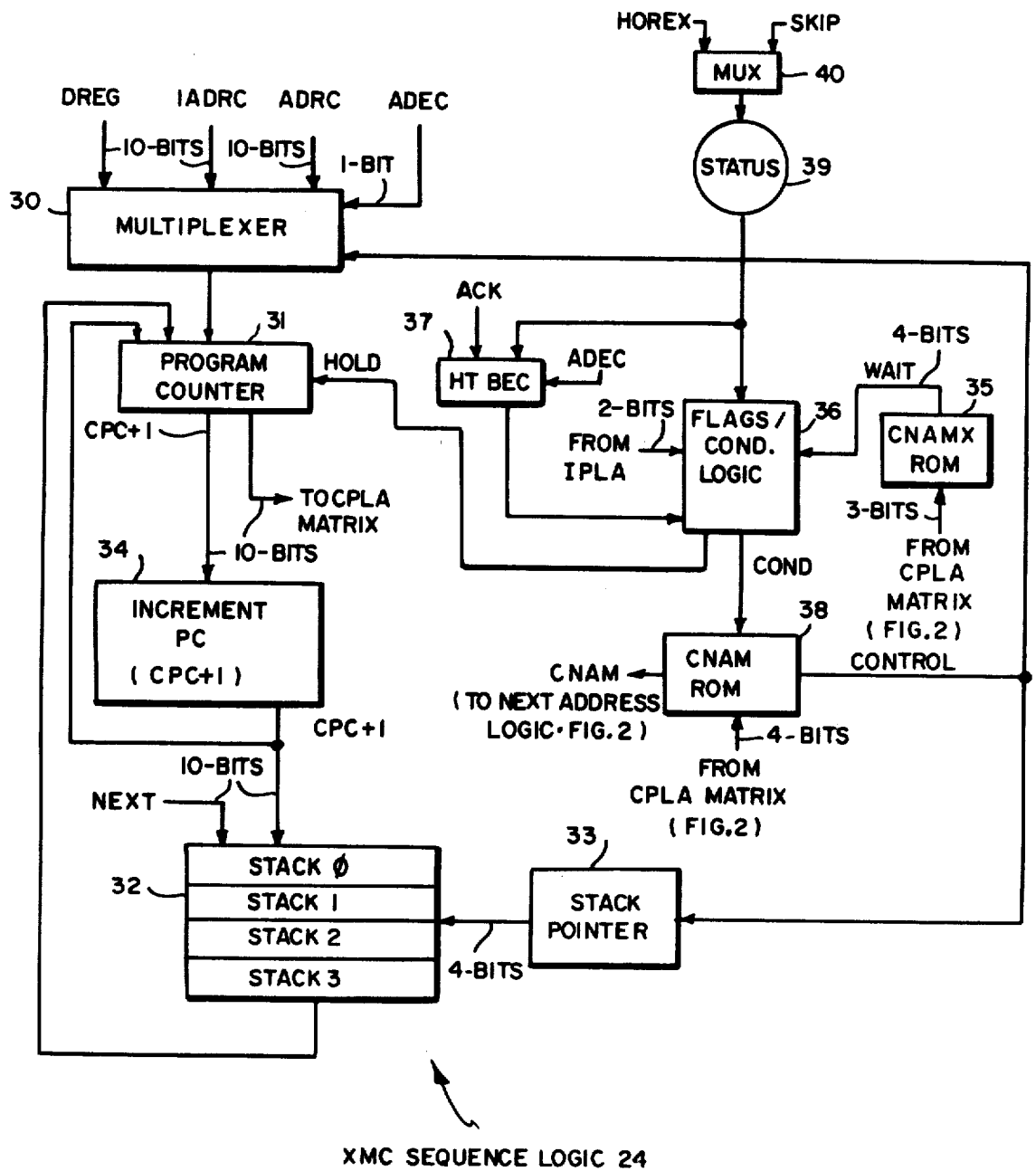
FIG. 3 shows a more specific block diagram of exemplary sequencing logic used in the external microcontroller interface unit of FIG. 2.

FIG. 3 depicts in more detail the elements of the external microcontroller (XMC) sequence logic unit 24. As can be seen therein, an appropriate multiplexer 30 supplies an address input to a program counter 31, such input being selected from either the IPLA decode unit 21 (the IADRC field), the CPLA matrix unit 25 (the ADRC field), or the dispatch register 26 (the DREG field). Alternatively, such address can be supplied to program counter 31 as a feedback input from a last in/first out memory stack 32. An appropriate control signal ADEC for the multiplexer unit is supplied from an IPLA control logic unit 29 (see FIG. 2).

When a request to decode a macroinstruction is issued by the CPU of FIG. 1, each macroinstruction includes within it the information which determines whether such macroinstruction is to be decoded by the internal, i.e., the CPU-resident, decoding units of the processor 10 or by an external microcontroller unit 13. Thus, each macroinstruction is arranged so that it has a unique bit pattern which can only be decoded by either the internal decoding units of the processor or the decoding units of a specified external microcontroller interface unit. In certain cases where a particular external microcontroller unit, such as shown in FIGS. 2 and 3, recognizes the bit pattern of the macroinstruction from the instruction register pipe line as one requiring decoding by itself, the IPLA decode/matrix unit 21 indicates such recognition by asserting a single bit MYINS ("my instruction") which is supplied to the IPLA control logic 29 to cause the assertion of an ACK ("acknowledge") signal for supply to the processor. The latter signal indicating that the macroinstruction which has been requested for decode (via a previous assertion of a suitable REQ ("request") signal) will be decoded by this particular microcontroller unit.

Should both a specified external microcontroller unit 13 and the CPU-resident decoding units of the processor recognize a macroinstruction bit pattern as being one which it is capable of decoding, an acknowledge (ACK) signal from the microcontroller interface unit is always interpreted by the central processor unit as requiring external microcode decoding, even if the CPU resident processor decoding units could decode such macroinstruction. Accordingly, decoding by the external unit prevails. Such operation is designated as an "external microcode override" condition. If no ACK signal is asserted from any external microcontroller unit, the processor utilizes its own internal macrocode decoding units, as discussed in the aforementioned application of Bernstein et al, for performing the macroinstruction decoding operation.

In addition, the assertion of a MYINS signal, together with the assertion of an appropriate "tri-state enable" (TSE) signal, will produce a "tri-state" (TS) signal from the IPLA control logic 29 for controlling the operation of the multiplexer/buffer register 22, In each external microcontroller unit 13, the TS signal is not asserted unless the MYINS signal has been asserted by the IPLA decode/matrix unit 21 to indicate that the particular microcontroller unit 13 in question has been selected for the decoding operation. Accordingly, the XMC bus 16 can be driven only by one external microcontroller unit at a time so that bus burn-out problems that may occur if multiple external units are attempting to drive the bus simultaneously are avoided.

Once the MYINS signal has been asserted, the IPLA control logic 29 provides an appropriate decode control signal (ADEC) which in effect represents a basic initiation signal for operation of the external microcontroller unit so as to permit appropriate decoding of the incoming macroinstruction to proceed.

The macroinstruction is initially decoded by the IPLA decode/matrix unit 21 which receives 32 bits comprising the 16 bit macroinstruction word and the 16 inversion bits therefor via the instruction register pipe line system 20, such system for handling incoming information in a pipe-lined fashion being well known to the art. The decoded macroinstruction word then selects the correct initial microinstruction word at the decoded address from the IPLA storage matrix which comprises a plurality of stored microinstruction words. The initial microinstruction word from the IPLA matrix comprises the following fields as shown below.

| 6 | 4 | 4 | 1 | 10 | 10 | 2 | 1 |
|---|---|---|---|---|---|---|---|
| ADRH | V1 | V2 | DEC | IADRC | NEXT | CNAMX | MYINS |

INITIAL MICROINSTRUCTION WORD FIELDS

As can be seen, the microinstruction word is 38 bits wide and includes 8 fields. The ADRH, V1, and V2 fields are effectively the same as those described in the aforesaid application of Bernstein et al. with reference to the horizontal address and vertical modifier fields of the initial microinstruction decoded by the CPU-resident decoding units. Such fields are appropriately supplied to the horizontal decoder and to the vertical modifier unit, respectively, in the manner discussed in the previously filed application. The MYINS bit has been discussed above.

The DEC field merely indicates which operation mode will be used with respect to the next address in the microinstruction sequence. In the case of the initial microinstruction obtained from the IPLA matrix, the DEC bit signifies either that the next operating mode will require a decoding of the next microinstruction of a sequence thereof or will require a call for a new macroinstruction (e.g., if there is only a single microinstruction in the current sequence). The DEC bit and the four CNAM bits from the CNAM ROM 38 (FIG. 3) generate the NAM bits via next address logic unit 23, which are transmitted to the CPU with the ADRH, V1 and V2 fields to indicate to the CPU the four operations discussed below. The IADRC field provides the address of one of the microinstructions (e.g., one of 1024 microinstructions in an exemplary embodiment) which are stored in the CPLA matrix unit 25. The selected microinstruction may either be executed next following the execution of the current microinstruction, or not, depending on the interpretation of the next address mode (NAM) field or the next address mode extensions (CNAMX) field, as discussed below.

The CNAMX field sets a plurality of appropriate flags (FLAG A, FLAG B or FLAG C) to their initial state in accordance with the following table:

| NOP | FLAG A = FLAG B = FLAG C = 0 |
|---|---|
| SET A | FLAG A = 1, FLAG B = FLAG C = 0 |
| SET B | FLAG B = 1, FLAG A = FLAG C = 0 |
| SET C | FLAG C = 1, FLAG A = FLAG B = 0 |

The next address mode (NAM) field indicates whether the external microcontroller sequencing operation should continue with the fetching and execution of the next microinstruction of the sequence or whether it should continue to re-execute the same vertical modifiers in the currently executing microinstruction in accordance with whether the NAM field indicates a true repeat (TREPT) or a false repeat (FREPT) condition. The NAM field further determines whether or not a decode operation should take place as discussed with reference to the vertical sequence unit of the processor as discussed in the aforesaid Bernstein et al. application. The NAM field conditions are summarized as follows:

| NEXT | Continue fetching and executing microcode |
|---|---|
| TREPT | If SKIP = 1, re-execute vertical, else NEXT |
| FREPT | If SKIP = 0, re-execute vertical, else NEXT |
| DECODE | Same as in CPU-resident vertical sequencer |

The NEXT field points to an address of one of the microinstructions in the CPLA. Such pointer provides the value of the control program counter subsequent to the current program counter content (i.e., CPC + 1 in FIG. 3) which is needed by the CNAM micro-order CALL. The CPC + 1 is not otherwise available without the NEXT field since the IPLA decode/matrix unit 21 is not addressed by the control program counter (instead it is the IPLA which initializes the control program counter). Thus, the NEXT field in effect pushes a return to the stack (FIG. 3) so that the system knows where to return after a sub-routine has been executed.

Once the initial microinstruction has been decoded and the NAM field indicates that the next microinstruction should be fetched and executed, the next microinstruction, and each subsequent one of a sequence thereof, is supplied by the CPLA matrix unit 25 which selects a microinstruction at the selected address therein. The microinstruction that is selected supplies the ADRH, V1 and V2 fields to the output multiplexer/buffer unit 22 and, thence, to the external microde bus 16. The complete field representation for a microinstruction obtained from the CPLA matrix unit 25 is shown below:

| 6 | 4 | 4 | 4 | 10 | 3 |
|---|---|---|---|---|---|
| ADRH | V1 | V2 | CNAM | ADRC | CNAMX |

CPLA MICROINSTRUCTION WORD FIELDS

The ADRH, V1 and V2 fields of the 31 bit CPLA microinstruction word are as discussed above with reference to the IPLA microinstruction word and supply the horizontal address and vertical modifier fields to the processor via microcode bus 16. The ADRC field provides the address of one of the microinstructions in the CPLA matrix unit 25. Such microinstruction may or may not be executed next depending on the interpretation of the CNAM and CNAMX fields, the ADRC field specifying both unconditional and conditional branch addresses which are to be used in determining the new control program counter (PC) value.

The CNAM field is a four bit field which specifies one of the following 14 encodings.

| JUMP | CPC = ADRC |
|---|---|
| RLNEXT | DREG = ADRC, CPC = CPC + 1 |
| TREPT | JUMP |
| FREPT | JUMP |
| DECODE | STOP SENDING XMC MICROCODE TO THE CPU |
| CALL | PUSH CPC + 1 ONTO SUBROUTINE STACK, THEN JUMP |
| RTRN | POP SUBROUTINE STACK INTO CPC |
| TJUMP | IF COND = 1, THEN JUMP, ELSE CPC = CPC + 1 |
| FJUMP | IF COND = 0, THEN JUMP, ELSE CPC = CPC + 1 |
| TCALL | IF COND = 1, THEN CALL, ELSE CPC = CPC + 1 |
| FCALL | IF COND = 0, THEN CALL, ELSE CPC = CPC + 1 |
| TRTRN | IF COND = 1, THEN RTRN, ELSE JUMP |
| FRTRN | IF COND = 0, THEN RTRN, ELSE JUMP |
| RJUMP | CPC = DREG |

The first 7 encodings are unconditionals while the rest are conditionals, which conditions are specified by the CNAMX field discussed below. In the particular embodiment shown, the subroutine stack (shown in FIG. 3) is four deep (stacks 0-3) so that only four nested subroutine calls are possible. The DREG refers to the dispatch register 26 shown in FIG. 2.

The CNAMX field has 8 encodings for both unconditionals and conditionals as follows:

| UNCONDITIONAL | |
|---|---|
| NOP | NO OPERATION |
| CLRX | FLAG A = 0, FLAG B = 0, FLAG C = 0 |
| SET A | FLAG A = 1 |
| SET B | FLAG B = 1 |
| SET C | FLAG C = 1 |
| CLRA | FLAG A = 0 |
| CLRB | FLAG B = 0 |
| CLRC | FLAG C = 0 |
| CONDITIONAL | |
| WAIT 0 | COND = SKIP |
| WAIT 1 | COND = SKIP |
| WAIT 2 | COND = SKIP |
| WAIT 3 | COND = SKIP |
| FLAG A | COND = FLAG A |
| FLAG B | COND = FLAG B |
| FLAG C | COND = FLAG C |

In the conditional mode, waiting (Wait 0-Wait 3) is necessary due to the delay between the XMC microinstruction fetch by the XMC, the XMC microinstruction fetch by the CPU, the target horizontal's execution by the CPU, and the receipt of SKIP by the XMC unit, or the external loading of the dispatch register 26. Waiting is not necessary when any flag is specified because the flags are implemented by the XMC unit and are immediately available.

The HTBEC (horizontals-to-be-executed) counter 37 indicates how many microinstructions have been sent to the CPU but have not yet been executed. The HTBEC counter is incremented by the ACK signal, is decremented by the HOREX signal and is cleared by the ADEC signal. The contents thereof are compared to the WAIT request signal from the CNAMX ROM 35 in the flags/condition logic 36 to assure that the SKIP signal is returned for the microinstruction of interest (as discussed in more detail below with respect to the timing diagram of FIG. 4). The flags/condition logic 36 asserts a HOLD signal to hold the operation of the program counter 31 until the above-mentioned comparison indicates that the appropriate SKIP signal has been received. When the HOREX signal for the particular microinstruction of interest is received in phase II of a cycle, the SKIP signal for that microinstruction is returned in phase I of the following cycle.

Figure 4:
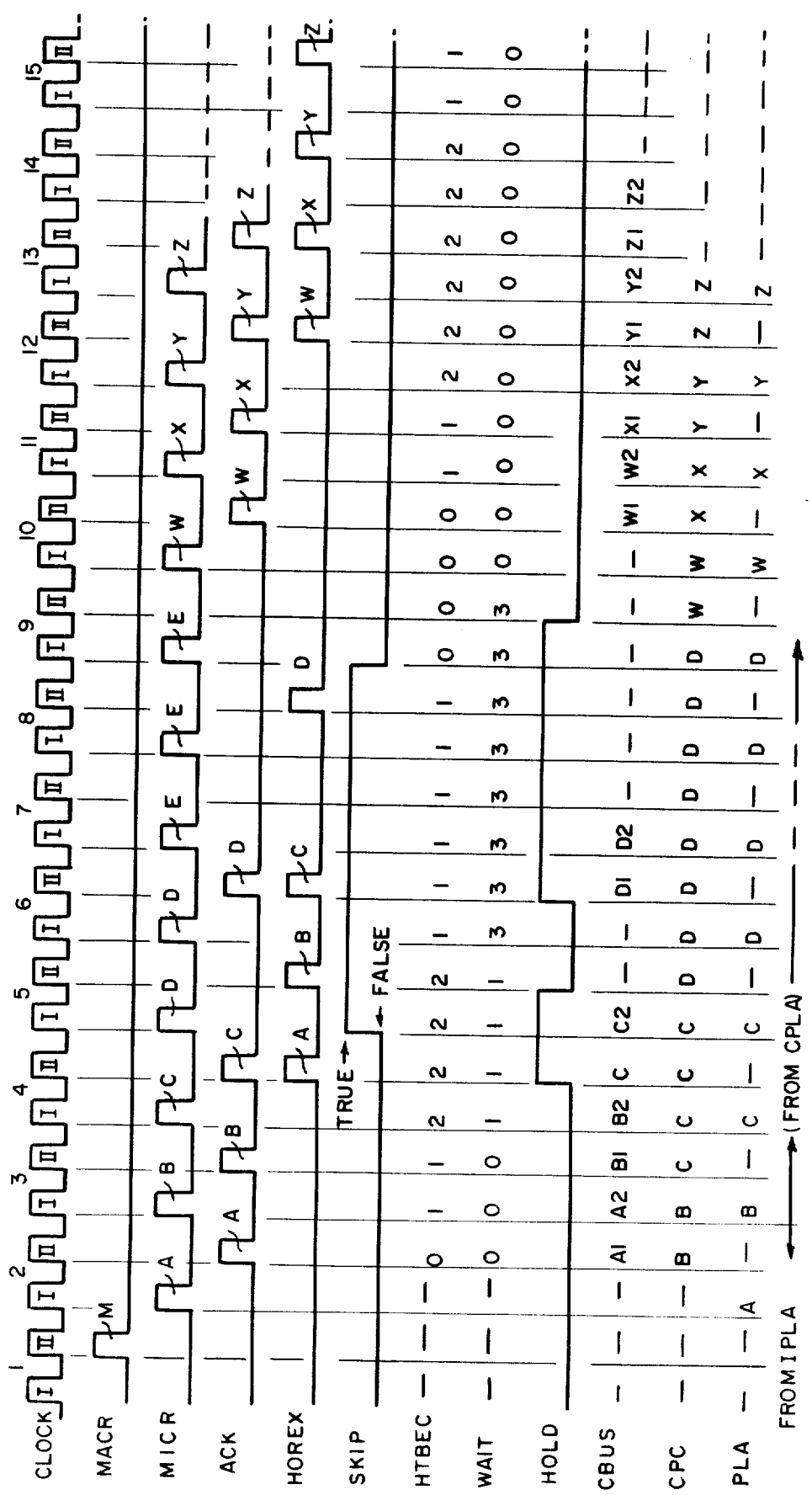
FIG. 4 shows a timing diagram helpful in understanding an exemplary operating sequence of the external microcontroller interface unit of the invention.

In order to understand the operation of the system shown in FIGS. 1-3 it is helpful to set forth a typical sequence of operations performed thereby as depicted with reference to the exemplary signal timing diagrams shown in FIG. 4 and Chart I shown below. FIG. 4 depicts various key signals which are asserted during the exemplary operation (and shown on FIGS. 2 and 3) while Chart I depicts the sequence of steps performed in the exemplary operations.

CHART I

| | ADR | CNAM | CNAMX | COMMENT |
|---|---|---|---|---|
| A: | TST | NEXT | — | THIS INSTRUCTION FETCHED FROM IPLA |
| B: | MOV | NEXT | — | THIS INSTRUCTION FETCHED FROM CPLA |
| C: | MOV | FJUMP/J | WAIT 1 | THIS BRANCHES TO J IF TST IN A WAS FALSE |
| D: | TST | FJUMP/W | WAIT 3 | THIS BRANCES TO W IF TST IN D WAS FALSE |
| E: | MOV | NEXT | — | THIS INSTRUCTION WILL NOT BE EXECUTED |
| , | , | , | , | , |
| , | , | , | , | , |
| , | , | , | , | , |
| J: | MOV | NEXT | — | THIS INSTRUCTION WILL NOT BE EXECUTED |
| , | , | , | , | , |

CHART I-continued

| ADR | CNAM | CNAMX | COMMENT |
|---|---|---|---|
| W: | MOV | NEXT | — | D WILL BRANCH TO HERE |
| X: | MOV | NEXT | — | THIS INSTRUCTION FETCHED FROM CPLA |
| Y: | MOV | NEXT | — | THIS INSTRUCTION FETCHED FROM CPLA |
| Z: | MOV | NEXT | — | THIS INSTRUCTION FETCHED FROM CPLA |

Each of the CLOCK cycles has two phases (I and II), a sequence of 15 cycles being shown in the example depicted. Initially, in the example shown, the CPU requests a macrocode decode operation M by asserting a MACR signal (a "macrocode" request) during phase II of cycle 1, immediately followed by a MICR signal (a "microcode" request) during phase I of cycle 2. If the macrocode is one which can be handled by the particular external microcontroller unit, such unit decodes the macroinstruction and asserts its ACK signal to show performance of the decode operation so as to produce the initial microinstruction A at the XMC bus. As depicted in FIG. 4 such microinstruction is placed on the bus in two portions A1 and A2 shown at the C bus at phase II of cycle 2 and at phase I of cycle 3, while acknowledging the decoding thereof, as mentioned above, by asserting the ACK signal at phase II of cycle 2.

As can be seen in Chart I, such microinstruction is a test instruction and is fetched from the IPLA decode/matrix unit 21. If the DEC field does not indicate that the decoding of a new macroinstruction is required (as, for example, when the currently decoded macroinstruction contained only a single microinstruction), the next microinstruction B is fetched from the CPLA matrix unit 25. Microinstruction A1, A2 is sent on the XMC bus to the CPU for execution while the HTBEC counter is incremented by "1" to show that a microinstruction has been sent to the CPU for execution but has not yet been executed.

When the next microinstruction B has been fetched from the CPLA it is acknowledged in phase II of cycle 3 and transmitted to the CPU, the HTBEC being again incremented (by 1) to "2" at phase I of cycle 4.

The next microinstruction C is then fetched from the CPLA and transmitted to the CPU. While this operation would normally increment the HTBEC to "3", by this time the first microinstruction A has been executed and the assertion of the HOREX (horizontal executed) signal from the CPU simultaneously decrements the HTBEC by 1 so that it remains at "2".

The CNAMX ROM 35 controls the extension of the time before the next microinstruction can be fetched. Thus, during microinstruction C the CNAMX ROM asserts a WAIT value of 1 (see Chart I) which together with the count of the HTBEC and the ACK signal determines whether the program counter should be held in its current state (i.e., whether a HOLD signal should be asserted—see FIG. 3). If microcode is currently being sent (an ACK is asserted), the program counter is held in its current state if the WAIT value plus the HTBEC count is equal to or greater than 3. If microcode is not currently being sent (no ACK is asserted), the program counter is held in its current state if the WAIT value and the HTBEC count is greater than 3. In the example of Chart I and FIG. 4, the sum of the WAIT value and the HTBEC count during phase II of cycle 4 is equal to 3 and the ACK is present so that the program counter is held in its current state. During phase II of cycle 5, since an ACK is not present and such sum is not greater than 3 the program counter is allowed to change from microinstruction C to microinstruction D.

In accordance with microinstruction C, the test which is made in microinstruction A determines whether the microprogram jumps directly to microinstruction J (when the test is "False") or whether the next sequential microinstruction D is to be used (when the test is "True"). In the particular example shown, the SKIP signal defines the test status (SKIP is "true" when high and "false" when low) and, as shown, is high (true) for microinstruction C. Accordingly, the sequence of operations proceeds to the next microinstruction D of the sequence.

Microinstruction D is then fetched after the above one cycle delay, at which time microinstruction B has been executed so that assertion of the HOREX signal from the CPU decrements the HTBEC to "1".

Microinstruction D asserts a WAIT 3 signal and the sum of the WAIT value and the HTBEC count is greater than 3 through phase II of cycle 9 so that the program counter is held in its current state through cycle 9, the HOLD signal producing a delay of 3 cycles to permit the test to be made in microinstruction D. Such test determines whether the microprogram jumps to microinstruction W (SKIP is false) or whether the next sequential microinstruction E is to be fetched for use (SKIP is true). In the particular example shown, the test (SKIP signal) at the end of the three cycle wait is shown to be false (SKIP is low), so that a branch is made to microinstruction W. Meanwhile HTBEC is decremented to zero to reflect the execution of microinstruction D. The sequence of operations then proceeds with microinstructions W, X, Y, Z . . . as shown.

As mentioned above, the microinstructions are transmitted in the XMC bus in two 8-bit bytes (e.g., A1 and A2 for microinstruction A) during separate phases of the timing cycles. The initial microinstruction A is obtained from the IPLA unit 21, while all subsequent microinstructions are obtained from the CPLA unit 25. The HTBEC shows at all times how many horizontal microinstructions have been transmitted from the XMC unit to the processor and are still to be executed by the processor.

While the above description discusses the configuration and operation of a particular exemplary embodiment of the invention, modifications thereof within the spirit and scope of the invention will occur to those in the art. Hence, the invention is not to be limited to the specific embodiment shown and described herein except as defined by the appended claims.

What is claimed is:

1. A data processing system comprising
  a central processor unit including
  means responsive to a macroinstruction for decoding said macroinstruction to produce a sequence of one or more microinstructions; and
  processing logic means responsive to said microinstructions for executing said microinstructions to provide one or more data processing operations;
  said system further comprising
  one or more external microcode control units, each including means responsive to a macroinstruction received from said central processor unit for decoding said macroinstruction to produce a sequence of one or more microinstructions;

means responsive to said decoding means for transmitting said one or more microinstructions to said central processor unit for execution thereby;

and said decoding means further including means responsive to a macroinstruction received from said central processor unit for determining whether said macroinstruction is one which is to be decoded by a selected one of said external microcode control units or one which is to be decoded by said central processor unit.

2. A data processing system in accordance with claim 1 wherein each said external microcode control unit further includes control means responsive to said decoding means for assuring that said macroinstruction is decoded only by said selected external microcode control unit when said macroinstruction is capable of being decoded either by said selected external microcode control unit or by said central processor unit.

3. A data processing system in accordance with claims 1 or 2 wherein each said external microcode control unit comprises initial macroinstruction decode means responsive to a macroinstruction for decoding said macroinstruction to produce an initial microinstruction;

means for transmitting first selected fields of said initial microinstruction to said central processor unit for execution thereby;

further decode means responsive to other selected fields of said initial microinstruction for providing a sequence of one or more successive microinstructions; and means for transmitting first selected fields of said successive microinstructions to said central processor unit for execution thereby.

4. A data processing system in accordance with claim 3 wherein control means of each said external microcode control unit further includes means responsive to said decoding means and to said central processor unit for indicating the number of microinstructions which have been transmitted to said central processor unit and which have not yet been executed by said central processor unit.

5. A data processing system in accordance with claim 4 wherein said first selected fields of said initial microinstruction include one or more execution fields for use by said central processor unit in executing said initial microinstruction; and a next address mode field for indicating whether the sequence of microinstructions transmitted to said central processor unit from said external microcode control unit is to be continued or is to be completed upon execution of the current microinstruction.

6. A data processing system in accordance with claim 5 wherein said external microcode control unit includes program counter means for supplying an address to said further decode means of the next successive microinstruction of a sequence thereof;

stack means for storing one or more microinstructions for use in a sub-routine execution;

and further wherein said other selected fields of said initial microinstruction include a first address field capable of providing an address for supply to said program counter means;

a second address field for providing a pointer address in said further decode means for identifying an address in said stack means which provides an incremented value of said program counter means.

7. A data processing system in accordance with claim 6 wherein said external microcode control unit further includes means capable of providing an externally generated address for supply to said program counter means.

8. A data processing system in accordance with claim 7 wherein the first selected fields of said successive microinstructions from said further decode means include one or more execution fields for use by said central processor unit in executing said successive microinstructions; and other selected fields of said successive microinstructions include a first address field capable of providing an address for supply to said program counter means, and further including means for selecting for supply to said program counter means a first address field from said initial microinstruction, a first address field from one of said successive microinstructions, or said externally generated address.

9. A data processing system in accordance with claim 8 wherein said other selected fields of said successive microinstructions include a next address mode field for determining whether the next successive microinstruction in a sequence thereof is to be executed by said central processor unit, whether a portion of said execution fields are to be reexecuted by said central processor unit, or whether a new macroinstruction is to be decoded by said data processing system.

10. A data processing system in accordance with claim 9 wherein said other selected fields of said successive microinstructions include a control field for determining whether the execution cycle of a microinstruction is to be extended beyond the normal execution cycle therefor.

11. A data processing system in accordance with claims 1 or 2 wherein said transmitting means includes bus means interconnecting said external microcode control unit and said central processor unit; and driving means for placing a microinstruction produced by said external microcode control unit on to said bus means for transmission to said central processor unit;

and further wherein each said external microcode control unit includes means for activating its own driver means only when said external microcode control unit has been selected to decode said macroinstruction and to provide said sequence of one or more microinstructions.

* * * * *